Figure 1:
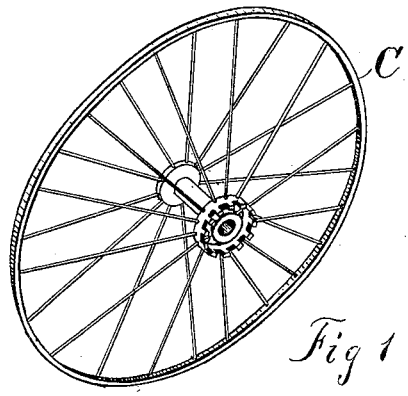

(No Model.)

G. R. PEARE.
VEHICLE WHEEL.

No. 421,013. Patented Feb. 11, 1890.

Witnesses
Alban Andrew
Henry Chadbourn.

Inventor
George R Peare

UNITED STATES PATENT OFFICE.

GEORGE R. PEARE, OF LYNN, ASSIGNOR TO EDWIN L. SPRAGUE, OF BOSTON, MASSACHUSETTS.

VEHICLE-WHEEL.

SPECIFICATION forming part of Letters Patent No. 421,013, dated February 11, 1890.

Application filed January 26, 1887. Renewed February 27, 1889. Again renewed December 14, 1889. Serial No. 333,719.

(No model.)

*To all whom it may concern:*

Be it known that I, GEORGE R. PEARE, a citizen of the United States, and a resident of Lynn, in the county of Essex and State of Massachusetts, have invented a new and useful Improvement in Vehicle-Wheels, of which the following, taken in connection with the accompanying drawings, is a specification.

This invention has for its object to improve vehicle-wheels, and especially those employed in connection with carriages for children, the aim of my invention being to produce a strong yet light and serviceable wheel of metal, the wheel having at its inner side a series of teeth to be engaged by a latch or equivalent, as in United States Patent No. 369,732, dated September 13, 1887. The said patent shows a toothed band or ring applied to the hub of a wooden wheel; but in this my present invention the ring is especially constructed, as will be described, to enable it to be applied to a so-called metal or wire spoked wheel, the ring being applied to the spokes near the hub of the wheel.

Like letters are employed to designate like parts in the drawings.

Figure 2:
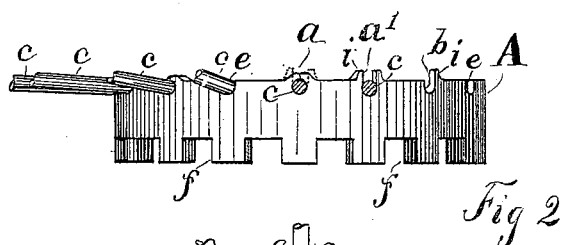
Figure 3:
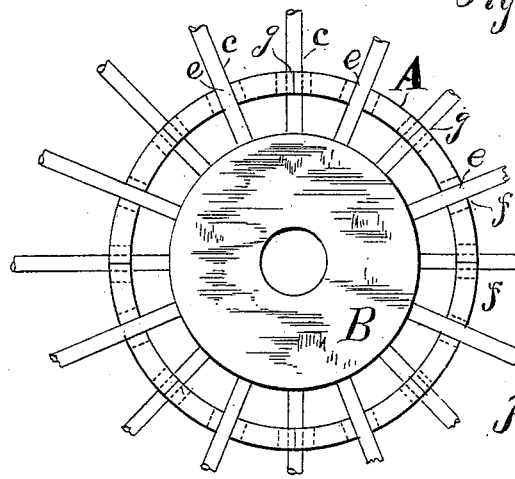

Figure 1 is a perspective view of a wire wheel having a ring combined with it in accordance with my invention; Fig. 2, a view of the ring enlarged to better show the spoke-receiving slots, the said figure showing the prongs at the sides of some of the slots as closed upon the spokes; and Fig. 3 is an enlarged view of the hub or central part of the hub with the toothed locking-ring and some of the spokes.

The wheel C is composed of a felly and tire, wire spokes $c$, and a metal hub B, having flanges near each end, to which the inner ends of the wire spoke are attached, all in usual manner. With a metal wheel of the class referred to I apply to the spokes $c$ at or near the hub a ring A, toothed at its front side, as at $f$, to be engaged by a locking device in accordance with the said patent. To secure this ring A in place, I have provided it at its inner side with a series of recesses or notches $e\ a\ a'$, which are adapted to be applied to and so as to embrace the said spokes. At one or both sides of the notches are projections $i$, which, when the spokes are in the notches, are bent over to lock the ring to the wheel.

Fig. 2 shows some of the projections as not as yet bent over to embrace the spoke.

The number of spokes that may be locked to the ring by the upsetting of the projections $i$ may be more or less, as the work may require, as also the number of slots $e$ and $a$ may be varied to receive all the spokes of the wheel, as in some wooden wheels, or all the spokes on one side, as in wire wheels, or just enough spokes to bring the ring concentric with the wheel.

In applying the annular piece or ring A to the wheel it is only necessary to drop the ring onto the wheel with its rear side next the spokes and move it around until the slots $e$ will drop down over the spokes, when the ring will be located concentric to the wheel regardless of the size or any roughness of the hub.

Referring to the drawings, it will be noticed that the spokes are attached to the flanges at the end of a long hub and thence go to the felly of the wheel in a diagonal direction, thus leaving the sides of the wheel conical, or forming what is called a "dish-shaped" wheel.

To seat the ring A firmly on the spokes inclined, as described, from the hub, the bottom of the recesses in the ring to receive the spokes are beveled to correspond with the inclination of the spokes.

Prior to my invention I am aware that rings having peripheral teeth extended radially therefrom have been secured to the spokes of a wheel, the said teeth being adapted to be engaged by the teeth of a chain belt to rotate the wheel; but in my invention the teeth $f$ are not radial, but parallel to the axis or center of rotation of the wheel, and are for an entirely different purpose, the said teeth $f$ never being engaged to cause the wheel to be rotated.

I claim—

1. In a vehicle-wheel, the annular piece A, having slots or notches $a\ e$ in its edge, adapted to receive the spokes $c\ c$, and adjacent to said slots the projections $i\ i$, capable of being upset over the spokes *c c*, as set forth.

2. The combination, with the spokes of a dish-shaped metallic wheel, of a ring secured to the spokes very near the hub of the wheel, the said ring having teeth *f* at its edge, which project from the wheel parallel to the center of rotation of the hub, substantially as described.

In testimony whereof I have signed my name to this specification, in the presence of two subscribing witnesses, on this 17th day of January, A. D. 1887.

GEORGE R. PEARE.

Witnesses:
ALBAN ANDRÉN,
HENRY CHADBOURN.